United States Patent
Ostrowski

Patent Number: 6,145,157
Date of Patent: Nov. 14, 2000

[54] WINDSHIELD WIPER ARRANGEMENT FOR VEHICLES

[75] Inventor: Wolfgang Ostrowski, Wolfsburg, Germany

[73] Assignee: Volkswagen AG, Wolfsburg, Germany

[21] Appl. No.: 09/152,707

[22] Filed: Sep. 14, 1998

Related U.S. Application Data

[63] Continuation of application No. PCT/EP97/00946, Feb. 27, 1997.

[30] Foreign Application Priority Data

Mar. 18, 1996 [DE] Germany .......................... 196 10 343

[51] Int. Cl.[7] .................. B60S 1/06; A47L 1/02; F16H 57/02
[52] U.S. Cl. ................. 15/250.31; 15/250.3; 74/606 R; 296/96.17
[58] Field of Search .............. 15/250.3, 250.31, 15/250.27; 296/96.15, 96.17, 192; 74/42, 606 R

[56] References Cited

U.S. PATENT DOCUMENTS

| | | | |
|---|---|---|---|
| 5,142,941 | 9/1992 | Amann et al. | 15/250.3 |
| 5,203,602 | 4/1993 | Eustache | 296/96.15 |
| 5,396,681 | 3/1995 | Hara | 15/250.31 |
| 5,878,631 | 3/1999 | Muehlpforte et al. | 15/250.3 |

FOREIGN PATENT DOCUMENTS

| | | | |
|---|---|---|---|
| 359733 | 3/1990 | European Pat. Off. | 15/250.3 |
| 2621287 | 4/1989 | France . | |
| 2640211 | 6/1990 | France | 15/250.31 |
| 4322632 | 1/1995 | Germany . | |
| 2219932 | 12/1989 | United Kingdom | 15/250.3 |
| 2258145 | 2/1993 | United Kingdom | 15/250.3 |

*Primary Examiner*—Gary K. Graham
*Attorney, Agent, or Firm*—Baker Botts L.L.P.

[57] ABSTRACT

A windshield wiper arrangement includes a mounting for a drive containing a wiper motor, a gear unit and a lever arm and two bearing brackets, spaced from the drive, containing wiper arm drive shafts each carrying an oscillating lever connected by a link rod to the lever arm. The mounting is an integral tubular structure shaped by high pressure forming of a tubular blank placed in a two-part mold having recesses extending essentially perpendicularly to the axis of the tubular part. Bushings for the drive shafts and a mount for the drive are forced into projections which are formed in the recesses when the tubular blank is shaped.

7 Claims, 4 Drawing Sheets

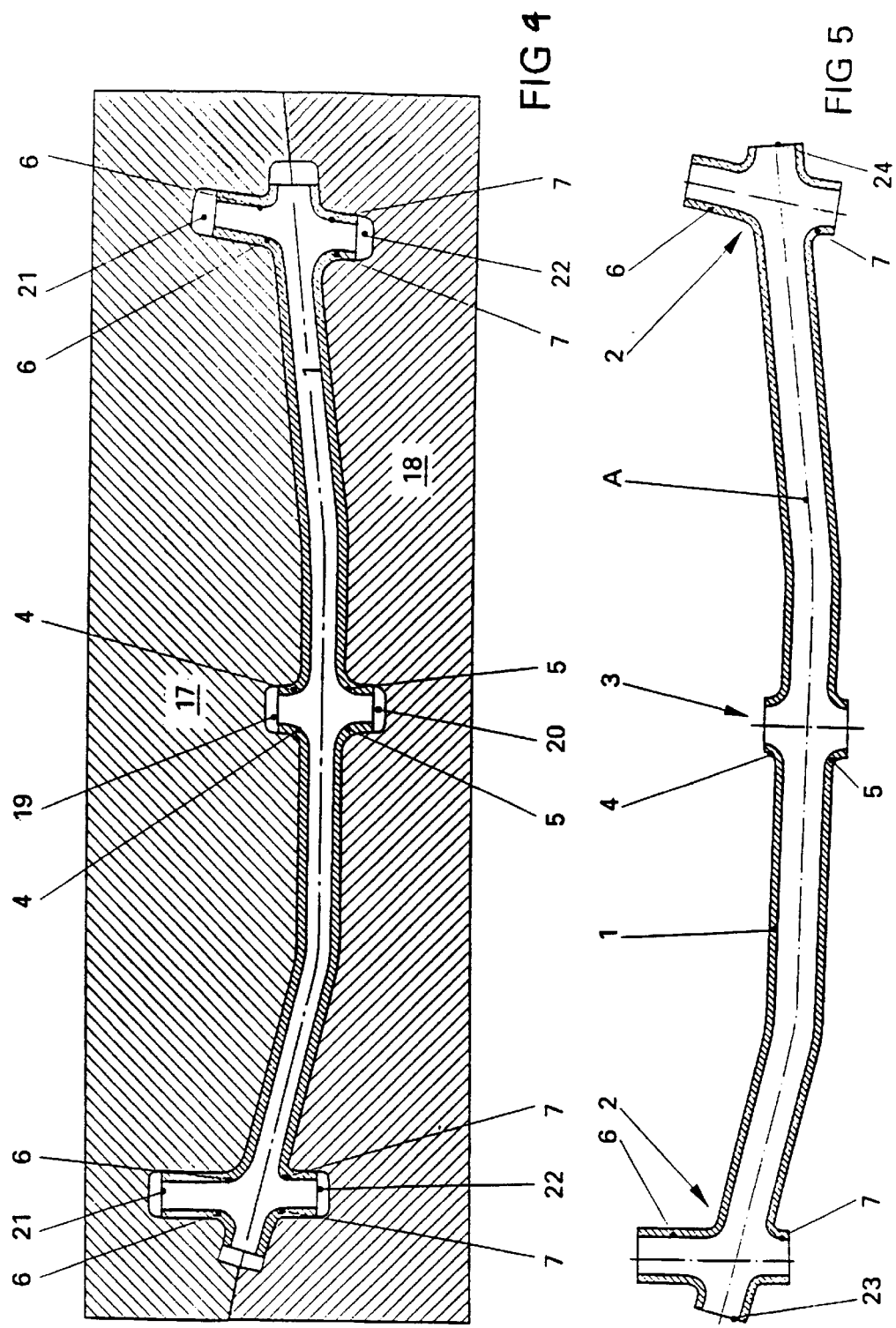

WINDSHIELD WIPER ARRANGEMENT FOR VEHICLES

REFERENCE TO RELATED APPLICATION

This application is a continuation of International Application No. PCT/EP97/00946 filed Feb. 27, 1997.

BACKGROUND OF THE INVENTION

This invention relates to windshield wiper arrangements for vehicles, such as motor vehicles, and to methods for manufacturing such arrangements.

Windshield wiper arrangements for vehicles are usually provided with a rack-and-pinion drive or a lever system. Windshield wiper am lagements having a lever system include a mounting for a drive comprising a wiper motor, a gear unit and a rotating lever arm that can be positioned on the vehicle body and generally also have two bearing brackets spaced at a distance from the mounting and the drive can be located between the bearing brackets or in the vicinity of one of the bearing brackets. A wiper arm drive shaft for each of the bearing brackets has an angularly fixed oscillating lever on the side opposite that wiper arm that is connected in an articulated manner to the lever arm by a link rod. With this arrangement, the rotary motion of the lever arm is converted into a reciprocating motion of each oscillating lever and thus of the wiper arm so that the wiper arms oscillate in synchronism.

The drive mounting can have a hollow shape or an open shape with an attached mounting plate upon which the drive elements are mounted and to which the bearing brackets, as externally manufactured cast parts, are attached by screws or swaging.

The manufacture of such conventional windshield wiper arrangements is accomplished by the manufacture of individual components, including the mounting, the mounting plate and the bearing brackets, and the subsequent assembly of these components into a unit. The unit is inserted in the vehicle and the wiper arms are then installed. It is apparent that the complexity of manufacture and assembly of conventional wiper arrangements is relatively great.

SUMMARY OF THE INVENTION

Accordingly, it is an object of the present invention to provide a windshield wiper arrangement for vehicles and a method for making it which overcomes the disadvantages of the prior art.

Another object of the invention is to provide a windshield wiper arrangement for vehicles, specifically motor vehicles, that can be manufactured with reduced complexity and hence less expensively, and a corresponding manufacturing method.

These and other objects of the invention are attained by providing a windshield wiper arrangement having a drive mounting which is a structural part with integral bearing brackets produced by internal high-pressure forming. This one-piece component is made in essentially one process step. Costly cast parts are no longer required. Moreover, assembly costs are reduced considerably, in part because tolerance adherence problems during assembly of the bearing brackets are eliminated. The arrangement is compact and has better power transmission.

The bearing brackets and the drive mount can be composed of opposed tubular projections extending essentially perpendicularly to the longitudinal axis of the structural part in order to increase the stability of the arrangement of the bushings and the drive.

The bushings can be pressed into the appropriate bearing brackets, which optimizes their fit but is also advantageous in connection with increased stability since the bushings pass completely through the tubular part. It is also particularly advantageous for the drive to be attached directly to the mounting, which is accomplished through mounting the gear unit, which is smaller than the motor, on the drive mounting. This results in a windshield wiper arrangement that, as a whole, takes up relatively little space in the vehicle.

The tubular projection on the wiper side of each bearing bracket can be longer than the opposite projection on the oscillating arm side. This produces a better fit of the bushings pressed into the bearing brackets and has a favorable effect on the stability of the assembly which is especially necessary in the region of the reciprocating wiper arms.

The windshield wiper arrangement is manufactured in accordance with the invention by cold forming the mounting, including the bearing brackets and a drive mount, in one piece from a tubular semifinished part with internal high-pressure forming.

In this process the semifinished part can be placed in a form with a pressure surface having the shape of the mounting to be formed, with pairs of opposed, cup-like recesses which are essentially radial to the longitudinal axis of the mounting in the pre-determined regions of the drive and the bearing brackets. The tubular semifinished part is subsequently subjected to high pressure by a pressure-transfer medium introduced into its interior, causing the tube walls to be pressed against the pressure surface on all sides and forced into the recesses in order to form tubular projections.

A bushing can be driven into the projections on opposite sides of the mounting that form a bearing bracket, and the gear unit housing for the gear unit arranged on the wiper motor can be pressed into the projections that form the drive mount, obviating the need for an additional attachment.

BRIEF DESCRIPTION OF THE DRAWINGS

Further objects and advantages of the invention will be apparent from a reading of the following description in conjunction with the accompanying drawings, in which:

FIG. 1a is a schematic diagram showing the operation of the windshield wiper arrangement;

FIG. 4 is a view similar to FIG. 3 showing the shape of the mounting after the application of pressure to the form; and FIG. 5 is a longitudinal sectional view showing the mounting removed from the form.

DESCRIPTION OF PREFERRED EMBODIMENTS

Figure 1:
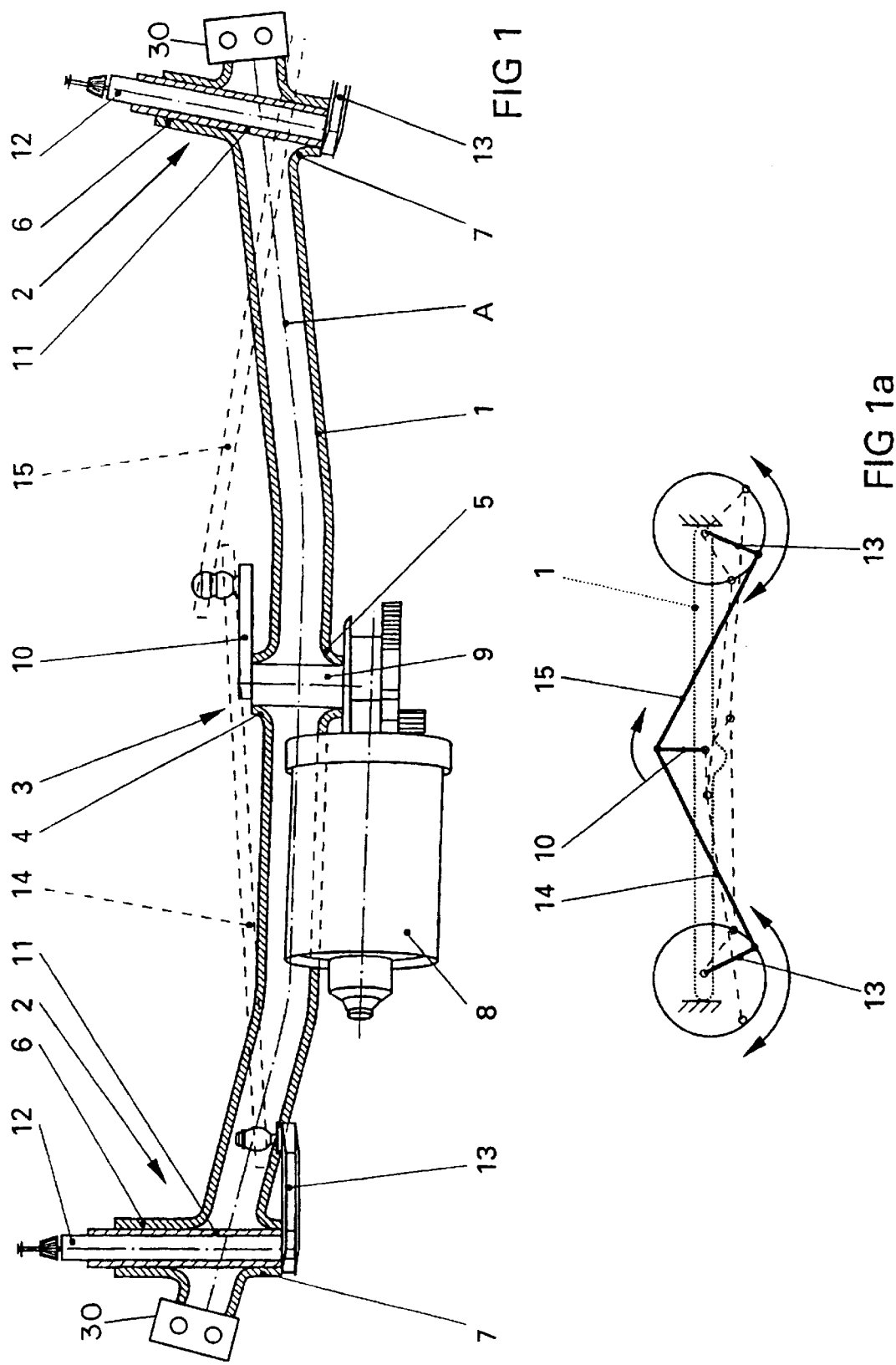
FIG. 1 is a schematic longitudinal sectional view showing a representative embodiment of a preassembled windshield wiper system in accordance with the invention, without wiper arms.

FIG. 1 shows a preassembled windshield wiper arrangement in accordance with the invention for installation in a motor vehicle. The preassembled unit has a tubular mounting 1 having a preferably circular cross-section and manufactured by internal high-pressure forming in which two bearing brackets 2 and a drive mount 3 are integrated. The drive mount 3 and the bearing brackets 2 each have two tubular projections 4 and 5 and 6 and 7, respectively, which extend essentially perpendicularly to the longitudinal axis of the mounting 1 and are disposed on opposite sides. The projections 6 on which the wiper arms (not shown) are to be installed are longer than the projections 7 which are on the opposite side of mounting 1. A housing for a gear unit 9 is mounted in the drive mount 1 and a wiper motor 8, the gear unit 9 and a rotating lever arm 10 are supported from the gear unit housing. The gear unit housing is pressed into the drive mount 3 so that it is enclosed by both of the projections 4 and 5. Bushings 11 pressed into the projections 6 and 7 that form the bearing brackets 2 each support a drive shaft 12 for a wiper arm. Oscillating levers 13 are affixed to the drive shafts 12 on the side away from the associated wiper arm and the levers 13, in turn, are connected in an articulated manner to the lever arm 10 by link rods 14 and 15, shown in dotted lines, so that the oscillating levers 13 are reciprocated in synchronism with each other when the lever arm 10 is rotated as shown in FIG. 1a. The preassembled windshield wiper arrangement is mounted in a motor vehicle (not shown) by couplings 30 at both ends of the mounting. The mounting is thus rigidly connected to the motor vehicle and provides support for the movable elements 10 and 13 through 15.

Figure 2:
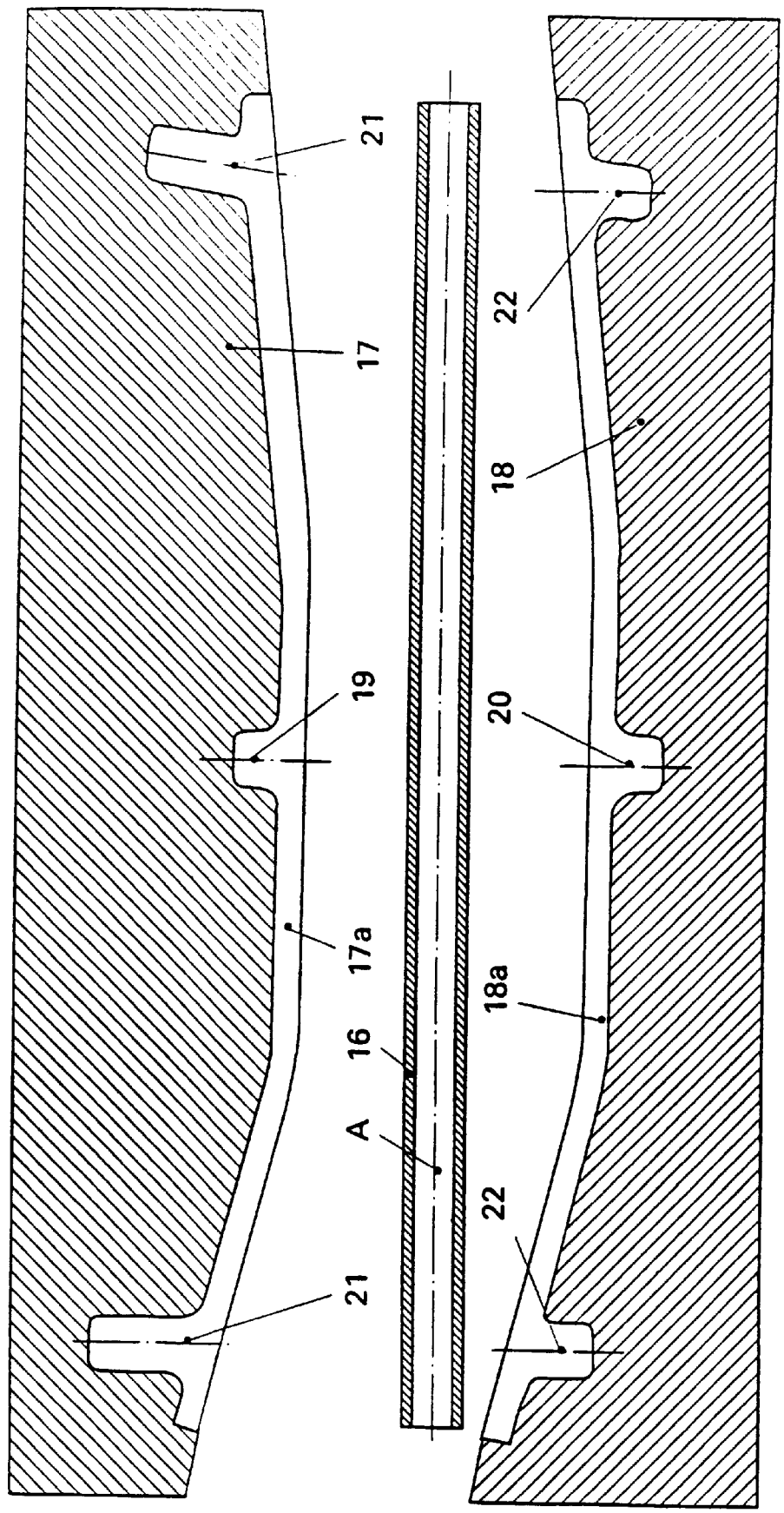
FIG. 2 is a longitudinal sectional view showing a form for the manufacture of a mounting in accordance with the invention and a tubular semifinished part having a circular cross-section.
Figure 3:
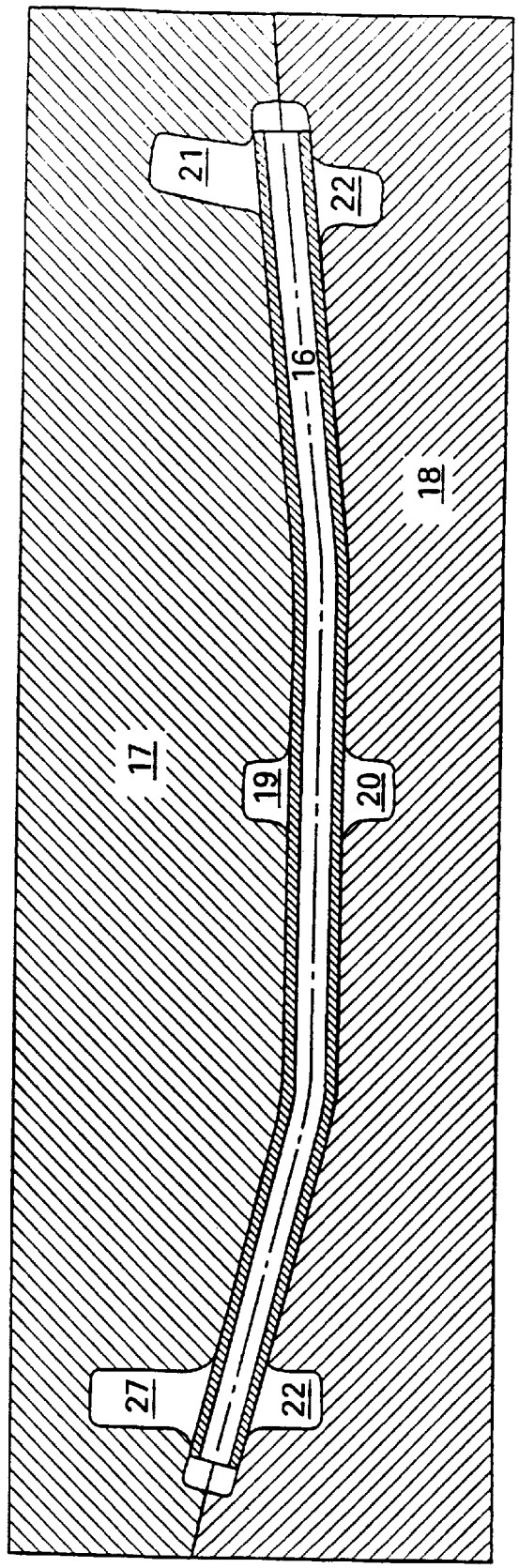
FIG. 3 is a view similar to FIG. 2 showing the form in the closed condition.

For the manufacture of a mounting 1 with integral bearing brackets 2 and an integral drive mount 3 for a windshield wiper arrangement in accordance with the invention, a tube 16, made for example of extruded aluminum, having a length and a diameter appropriate for the mounting 1, is placed in a form having two parts 17 and 18 with opposing pressure surfaces 17a and 18a as shown in FIG. 2. The parts 17 and 18 of the form have pairs of opposed, cup-like recesses 19 and 20 and 21 and 22 extending essentially radially to the longitudinal axis A of the tube to provide shaped regions for the drive 9 and the bearing brackets 2. When the two parts 17 and 18 of the form are pressed together, the tube 16 is slightly bent in the regions between the drive mount 3 and the bearing brackets 2 as shown in FIG. 3 in order to allow for the installation conditions in the vehicle. Thereafter, the tube engages the pressure surfaces 17a and 18a on all sides when the parts 17 and 18 are in contact. In this condition, pressure is applied to the interior of the tube, causing the tube wall to be forced into the recesses 19 and 20 and 21 and 22, thereby forming the tubular projections 4 and 5 and 6 and 7, respectively, as seen in FIG. 4. After the pressure is removed, the tube 16 which has been shaped into the mounting 1 is removed from the form. The bearing brackets 2 and the drive mount 3 are thus formed as a single piece as shown in FIG. 5. If necessary, open tube ends 23 and 24 can be squeezed together by an appropriate design of the forms 17 and 18 so that essentially flat contact surfaces are produced at the ends for attachment of the mounting 1 to the vehicle by screws or other fastening techniques.

Although the invention has been described herein with reference to specific embodiments, many modifications and variations therein will readily occur to those skilled in the art. Accordingly, all such variations and modifications are included within the intended scope of the invention.

I claim:

1. A windshield wiper arrangement for a vehicle, the arrangement comprising a mounting supporting an articulating lever assembly which is connected at a driven end with at least one wiper motor and at a drive end with at least one drive shaft for a windshield wiper arm wherein the mounting comprises a tubular structural part formed by internal high-pressure molding and having a longitudinal axis and having at least one integral bearing bracket for at least one of a drive shaft and an integral motor drive mount in which the bearing bracket has an axis extending transverse to the longitudinal axis of the tubular structure part and opens into the tubular structural part.

2. A windshield wiper arrangement in accordance with claim 1 including a motor drive mount and bearing brackets which each comprise two tubular projections formed on opposite sides of and disposed essentially perpendicularly to the longitudinal axis of the tubular structural part.

3. A windshield wiper arrangement in accordance with claim 2 including a bushing pressed into each of the tubular projections comprising a bearing bracket and including a housing for a gear unit mounted on the wiper motor and pressed into tubular projections forming the motor drive mount.

4. A windshield wiper arrangement in accordance with claim 2 wherein the projections on opposite sides of the tubular structural part are of different lengths and wherein a projection on the wiper side is longer.

5. A windshield wiper arrangement in accordance with claim 1 wherein the mounting has means at both ends for attaching it to a vehicle.

6. A windshield wiper arrangement in accordance with claim 1 including a drive containing the wiper motor, a gear unit and a lever arm, and having two bearing brackets spaced from the drive, each bearing bracket having a drive shaft for a wiper arm that includes an oscillating lever and wherein the oscillating lever is connected to the lever arm by a link rod.

7. A windshield wiper arrangement in accordance with claim 1 including a mount for accommodating the wiper motor formed on the mounting.

* * * * *